US006763187B2

(12) United States Patent
Shiraishi (10) Patent No.: US 6,763,187 B2
(45) Date of Patent: Jul. 13, 2004

(54) CAMERA APPARATUS WITH AN AUTO FOCUSING FUNCTION

(75) Inventor: Kenji Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/637,502

(22) Filed: Aug. 11, 2003

(65) Prior Publication Data

US 2004/0091254 A1 May 13, 2004

(30) Foreign Application Priority Data

Aug. 9, 2002 (JP) ......................................... 2002/233500

(51) Int. Cl.$^7$ .............................................. G03B 13/36
(52) U.S. Cl. ......................... 396/104; 396/125; 348/345
(58) Field of Search .................. 396/89, 104, 125–128; 348/345; 250/201.2, 201.6, 201.7, 201.8

(56) References Cited

U.S. PATENT DOCUMENTS 4,492,449 A * 1/1985 Oinoue et al. ............... 396/104
5,589,909 A * 12/1996 Kusaka ......................... 396/96
5,597,999 A * 1/1997 Kinba et al. ............. 250/201.7

FOREIGN PATENT DOCUMENTS

JP        2001-255456        9/2001

* cited by examiner

*Primary Examiner*—W. B. Perkey
(74) *Attorney, Agent, or Firm*—Oblon, Spivak, McClelland, Maier & Neustadt, P.C.

(57) ABSTRACT

A digital camera (1) has an outside light AF and a contrast type AF which is capable of selecting either outside light AF or contrast type AF based on a command for an operation by a photographer, and has a photographing mode which carries out a focusing by the contrast type AF even when the outside light AF is selected by the command for the operation by the photographer.

15 Claims, 10 Drawing Sheets

CAMERA APPARATUS WITH AN AUTO FOCUSING FUNCTION

BACKGROUND OF THE INVENTION

1. Field of the Invention

The present invention relates to a camera apparatus with an auto focusing function, which includes a plurality of auto focusing devices and which is capable of carrying out a high speed and a high accuracy focusing by using an optimum auto focusing device corresponding to a photographing mode.

2. Description of the Prior Art

Conventionally, a camera apparatus such as a still camera or a video camera or the like is provided with an auto focusing (hereinafter, referred to as AF) function for adjusting a focusing of an image of a subject automatically. A contrast type AF function (hereinafter, referred to as contrast AF) is often used in an electronic camera device such as a digital camera.

The contrast AF moves a focus lens of a camera and evaluates with sampling a contrast (including a sharpness of the image) of the image of the subject obtained by a CCD or the like in every movement of the focus lens of the camera through the focus lens sequentially at real time, and stops the movement of the focus lens by judging that a position in which an evaluated value becomes maximum is a focusing position.

The contrast AF requires a long time to focus, but, has an advantage that a focusing accuracy is high.

The evaluated value is generally created by an output of a high frequency transmission filter of a CCD output signal or the like, and it takes more time to focus as a number of sampling increases. For example, the number of sampling increases as a focusing distance of a photographic optical system becomes longer, a range of a photographing distance becomes wider or setting a frequency of the sampling higher to raise the focusing accuracy, thereby a time required for the focusing also becomes longer.

Also, a ranging type AF function (so-called an outside light AF) is often used for a silver salt camera or the like. The outside light AF carries out a distance measuring to the subject by projecting an infrared ray or a supersonic wave or the like to the subject and moves the focus lens to the focusing position corresponding to the measured distance.

Although a focusing accuracy of the camera inferiors to the focusing accuracy compared with the contrast type AF, the ranging type AF function has an advantage that a focusing speed is high and is adapted to photograph a dynamic subject.

As described above, those AF functions each have a different advantage. In this connection, Japanese Patent Laid Open No. 2001-255456 describes an AF device which has both of two kinds of AF functions and which is capable of switching so as to select either AF function selectively corresponding to a photographing condition or a condition of the subject.

According to the Japanese Patent Laid Open No. 2001-256456, it is constituted that the contrast type AF function can be used when carrying out the photographing which the focusing accuracy is required, and the outside light AF function can be used when carrying out the photographing with a mode (dynamic subject mode, continuous photographing mode) corresponding to "scene that a time-lag is undesirable" such as photographing the dynamic subject or photographing the subject that is moving fast continuously.

However, in the AF device disclosed in the Japanese Patent Laid Open No. 2001-255456, a photographer has to select either of the two kind of AF functions beforehand. Therefore, there is a case of losing a timing for the photographing when the contrast type AF function which takes long time to focus while the focusing accuracy is high is previously selected and suddenly a necessity of photographing the "scene that the time-lag is undesirable" such as photographing the subject that moving fast is occurred.

In recent, there has been proposed an AF device that either of AF functions is automatically selected by an operation of a shutter release button. According to such AF device, the contrast type AF function is selected, if the shutter release button is half-pressed and then is pressed slowly, and the outside light AF function is selected if the shutter release button is pressed at once without being half-pressed. The contrast type AF function can be used when carrying out the photographing that the high focusing accuracy is required such as a portrait photograph or the like by pressing-in the shutter release button slowly, and the outside light AF function can be used when carrying out the photographing that the timing for the photographing is necessary such as photographing the dynamic subject as the subject by pressing-in the shutter release button at once.

However, depending on the photographing condition, there is a case that the focusing accuracy is desired to prioritize rather than a focusing time regardless of the operation of the shutter release button.

For example, a self-timer photographing carries out the photographing after a certain waiting time is lapsed after pressing the shutter release button, accordingly, there is no necessity of considering the timing for the photographing. The high focusing speed is not required since there is the waiting time for the photographing to be started after the shutter release button is pressed, and therefore it is appropriate to carry out the photographing by prioritizing the focusing accuracy.

In such case, there has been a problem in the above AF device that the enough focusing accuracy cannot be obtained since the outside light AF which the focusing time is prioritized is to be selected if the photographer presses-in the shutter release button at once.

On the contrary, even when it is appropriate that the focusing time prioritizes rather than the focusing accuracy, there has been also a problem of losing the timing for the photographing since the contrast type AF unction is selected depending on the photographer's operation so it takes time to be focused.

SUMMARY OF THE INVENTION

The present invention has been made in view of the aforementioned circumstances and it is, therefore, an object of the present invention to provide a camera apparatus with an auto focusing function for preventing a failure of photographing by selecting an AF function that is suitable for a photographing condition automatically even though an operation selecting the AF function that not suitable for the photographic condition is carried out in a photographing mode corresponding to the photographing condition.

To accomplish the aforementioned object, according to a camera apparatus with an auto focusing function in the first aspect of the present invention, it comprises a ranging type auto focusing device for carrying out a focusing by measuring a distance to a subject and moving a focus lens to a focusing position corresponding to the measured distance; a contrast type auto focusing device for carrying out the focusing by moving the focus lens while evaluating a contrast of an image of the subject obtained through the focus lens and judging a focusing position based on tho evaluated contrast together with stopping the focus lens at the judged focusing position.

The apparatus is capable of selecting either the ranging type auto focusing device or the contrast type auto focusing device to carry out the focusing based on a command for an operation of a photographer.

The apparatus has also a photographing mode to carry out the focusing by the contrast type auto focusing device even when the command for the operation to select the focusing by the ranging type auto focusing device is carried out by the photographer.

According to a camera apparatus with an auto focusing function in the second aspect of the present invention, it comprises a ranging type auto focusing device for carrying out a focusing by measuring a distance to a subject and moving a focus lens to a focusing position corresponding to the measured distance; a contrast type auto focusing device for carrying out the focusing by moving the focus lens while evaluating a contrast of an image of the subject obtained through the focus lens and judging a focusing position based on the evaluated contrast together with stopping the focus lens at the judged focusing position; an inputting device for inputting a focusing starting trigger for receiving the inputting of the focusing starting trigger which is for starting the focusing; and an inputting device for inputting a photographing starting trigger for receiving the inputting of the photographing starting trigger which is for starting a photographing of the subject.

Further, the apparatus has a photographing mode to carry out the focusing by the contrast type auto focusing device or a combination of the contrast type auto focusing device and the ranging type auto focusing device when the photographing starting trigger is inputted into the inputting device for inputting the photographing starting trigger within a predetermined time after the focusing starting trigger is inputted into the inputting device for inputting the focusing starting trigger.

According to a camera apparatus with an auto focusing function in the third aspect of the present invention, it comprises a ranging type auto focusing device for carrying out a focusing by measuring a distance to a subject and moving a focus lens to a focusing position corresponding to the measured distance; a contrast type auto focusing device for carrying out the focusing by moving the focus lens while evaluating a contrast of an image of the subject obtained through the focus lens and judging a focusing position based on the evaluated contrast together with stopping the focus lens at the judged focusing position; an inputting device for inputting a focusing starting trigger for receiving the inputting of the focusing starting trigger which is for starting the focusing; and an inputting device for inputting a photographing starting trigger for receiving the inputting of the photographing starting trigger which is for starting a photographing or the subject.

The apparatus has a photographing mode to carry out the focusing by the contrast type auto focusing device or a combination of the contrast type auto focusing device and the ranging type auto focusing device when the photographing starting trigger is inputted into the inputting device for inputting the photographing starting trigger without the focusing starting trigger being inputted into the inputting device for inputting the focusing starting trigger.

A camera apparatus with an auto focusing function in the fourth aspect of the present invention has, in the apparatus according to the second aspect, a self-timer mode for carrying out the photographing of the subject after a certain waiting time is elapsed after the photographing starting trigger is inputted into the inputting device for inputting the photographing starting trigger, and the photographing mode is the self-timer mode.

A camera apparatus with an auto focusing function in the fifth aspect of the present invention has, in the apparatus according to the third aspect, a self-timer mode for carrying out the photographing of the subject after a certain waiting time is elapsed after the photographing starting trigger is inputted into the inputting device for inputting the photographing starting trigger, and the photographing mode is the self-timer mode.

A camera apparatus with an auto focusing function in the sixth aspect of the present invention has, in the apparatus according to the second aspect, a close photographing mode in which the distance and a range photographable are set closer than that of a normal photographing so as to carry out the photographing of the subject by closing to the subject; and the photographing mode is the close photographing mode.

A camera apparatus with an auto focusing function in the seventh aspect of the present invention has, in the apparatus according to the third aspect, a close photographing mode in which the distance and a range photographable are set closer than that of a normal photographing so as to carry out the photographing of the subject by closing to the subject, and the photographing mode is the close photographing mode.

A camera apparatus with an auto focusing function in the eighth aspect of the present invention has, in the apparatus according to the second aspect, a remote control photographing mode which is able to carry out the inputting of the focusing starting trigger and the photographing starting trigger by means of an operation of a remote control, and the photographing mode is the remote control photographing mode.

A camera apparatus with an auto focusing function in the ninth aspect of the present invention has, in the apparatus according to the third aspect, a remote control photographing mode which is able to carry out the inputting of the focusing starting trigger and the photographing starting trigger by means of an operation of a remote control, and the photographing mode is the remote control photographing mode.

According to a camera apparatus with an auto focusing function in the tenth aspect of the present invention, it comprises a ranging type auto focusing device for carrying out a focusing by measuring a distance to a subject and moving a focus lens to a focusing position corresponding to the measured distance; a contrast type auto focusing device for carrying out the focusing by moving the focus lens while evaluating a contrast of an image of the subject obtained through the focus lens and judging a focusing position based on the evaluated contrast together with stopping the focus lens at the judged focusing position; an inputting device for inputting a focusing starting trigger for receiving the inputting of the focusing starting trigger which is for starting the focusing; and an inputting device for inputting a photographing starting trigger for receiving the inputting of the photographing starting trigger which is for starting a photographing of the subject.

The apparatus has also an interval photographical mode in which the photographing is repeatedly carried out in every certain time interval automatically when the photographing starting trigger is inputted into the inputting device for inputting the photographing starting trigger.

The focusing of a first photographing is carried out by the ranging type auto focusing device and the focusing of a second photographing and from then on are carried out by the contrast type auto focusing device or a combination of the contrast type auto focusing device and the ranging type auto focusing device within a series of photographing in the interval photographical mode when the photographing starting trigger is inputted into the inputting device for inputting the photographing starting trigger within a predetermined time after the focusing starting trigger is inputted into the inputting device for inputting the focusing starting trigger in the interval photographical mode.

According to a camera apparatus with an auto focusing function in the eleventh aspect of the present invention, it comprises a ranging type auto focusing device for carrying out a focusing by measuring a distance to a subject and moving a focus lens to a focusing position corresponding to the measured distance; a contrast type auto focusing device for carrying out the focusing by moving the focus lens while evaluating a contrast of an image of the subject obtained through the focus lens and judging a focusing position based on the evaluated contrast together with stopping the focus lens at the judged focusing position; an inputting device for inputting a focusing starting trigger for receiving the inputting of the focusing starting trigger which is for starting the focusing; and an inputting device for inputting a photographing starting trigger for receiving the inputting of the photographing starting trigger which is for starting a photographing of the subject.

The apparatus has also an interval photographical mode in which the photographing is repeatedly carried out in every certain time interval automatically when the photographing starting trigger is inputted into the inputting device for inputting the photographing starting trigger.

The focusing of a first photographing is carried out by the ranging type auto focusing device and the focusing of a second photographing and from then on are carried out by the contrast type auto focusing device or a combination of the contrast type auto focusing device and the ranging type auto focusing device within a series of photographing in the interval photographical mode when the photographing starting trigger is inputted into the inputting device for inputting the photographing starting trigger without the focusing starting trigger being inputted into the inputting device for inputting the focusing starting trigger in the interval photographical mode.

A camera apparatus with an auto focusing function in the twelfth aspect of the present invention, in the apparatus according to the tenth aspect, the focusing is carried out by the ranging type auto focusing device when the photographing starting trigger is inputted within a predetermined time after the focusing starting trigger is inputted into the inputting device for inputting a focusing starting trigger during the photographing by the interval photographical mode.

A camera apparatus with an auto focusing function in the thirteenth aspect of the present invention, in the apparatus according to the eleventh aspect, the focusing is carried out by the ranging type auto focusing device when the photographing starting trigger is inputted within a predetermined time after the focusing starting trigger is inputted into the inputting device for inputting a focusing starting trigger during the photographing by the interval photographical mode.

A camera apparatus with an auto focusing function in the fourteenth aspect of the present invention, in the apparatus according to the tenth aspect, the focusing is carried out by the ranging type auto focusing device when the photographing starting trigger in inputted into the inputting device for inputting the photographing starting trigger without the focusing starting trigger being inputted into the inputting device for inputting the focusing starting trigger during the photographing by the interval photographical mode.

A camera apparatus with an auto focusing function in the fifteenth aspect of the present invention, in the apparatus according to the eleventh aspect, the focusing is carried out by the ranging type auto focusing device when the photographing starting trigger is inputted into the inputting device for inputting the photographing starting trigger without the focusing starting trigger being inputted into the inputting device for inputting the focusing starting trigger during the photographing by the interval photographical mode.

DETAILED DESCRIPTION OF THE PREFERRED EMBODIMENTS

Figure 1:
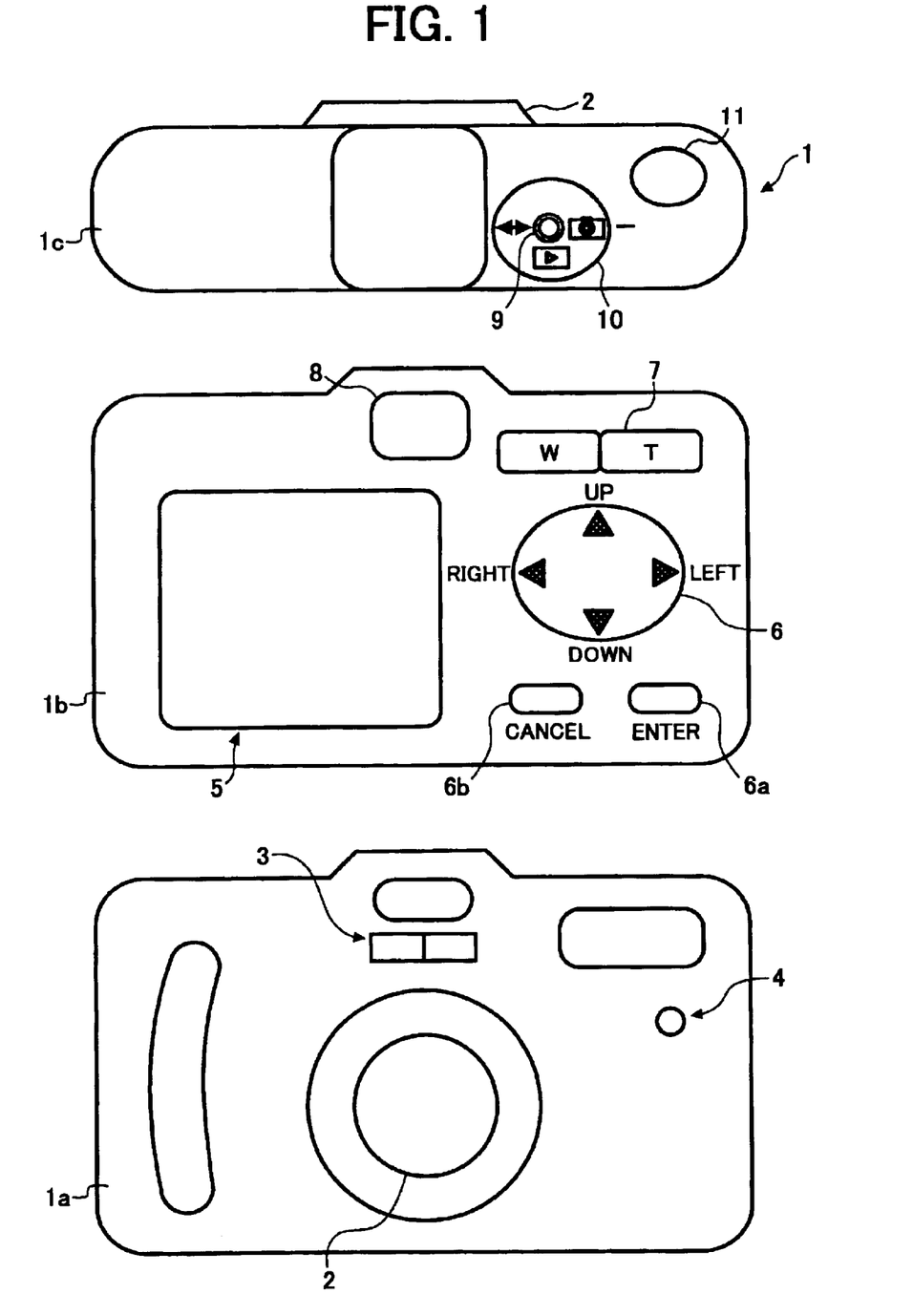
FIG. 1 is an outside view diagram of a digital camera relating to an embodiment of the present invention.

An outside view diagram of a digital camera 1 as a camera apparatus with an auto focusing function relating to the embodiment of the present invention is shown in FIG. 1. The digital camera 1 has an outside light AF function as a ranging type AF device (ranging type AF device) and a contrast AF function as a function type AF device (contrast type AF device).

At a front surface 1a of the digital camera 1, there is provided a photographing lens 2, a sending and receiving unit for an outside light AF 3 as a part of the ranging type AF device and a remote control receiving unit 4. The sending and receiving unit for the outside light AF 3 measures a distance to a subject by projecting an infrared ray, for example, to the subject and receiving its reflected light when carrying out a focusing by the outside light AF. The remote control receiving unit 4 receives various operating signals such as a photographing operation or a photographing condition-setting operation by a radio wave or the infrared ray from a remote control device as a separated body which is not shown.

At a back surface 1b of the digital camera 1, there is provided a displaying unit 6, operating button 6, an ENTER button 6a, a CANCEL button 6b, a zooming button 7 and a viewfinder 8. The displaying unit 5 is composed of a liquid crystal (LC) or the like for example, and displays the subject when photographing or playing and displaying a photographed image. The operating button 6 carries out various operations such as a photographing condition setting, photographing mode changing or selecting of played image or the like.

The other than a normal mode for carrying out a normal photographing, the digital camera 1 has various photographing modes such as a self-timer mode in which the photographing is carried out after a certain time has passed after pressing a shutter release button, a close photographing mode for photographing by going close to the subject, a remote control photographing mode for carrying out the photographing by receiving a photographing signal from the remote control device, or an interval photographical mode for carrying out the photographing repeatedly in every predetermined time interval after the shutter release button is pressed. The changing of those photographing modes can be carried out by an operation of the operating button 6.

The ENTER button 6a and the CANCEL button 6b are buttons for confirming and canceling the various operations by the operating button 6, and the zooming button 7 is a button for carrying out a zooming operation of a photographing image to the subject. The viewfinder 8 is an observation window for viewing the subject when photographing and it is constituted that the image of the subject transmits from the front surface 1a.

There is provided on an upper surface 1c of the digital camera 1 a power button 9, a switching over dial 10, and a shutter release button 11. The power button 9 is a button for carrying out an on-off operation of a main power provided in a body of the digital camera 1, and the switching over dial 10 is for switching over an operating mode.

It is possible to switch over the operating mode of the digital camera 1 to the photographing mode for carrying out the photographing of the subject or a playing mode for playing and displaying the photographed image on the displaying unit 5.

Figure 2:
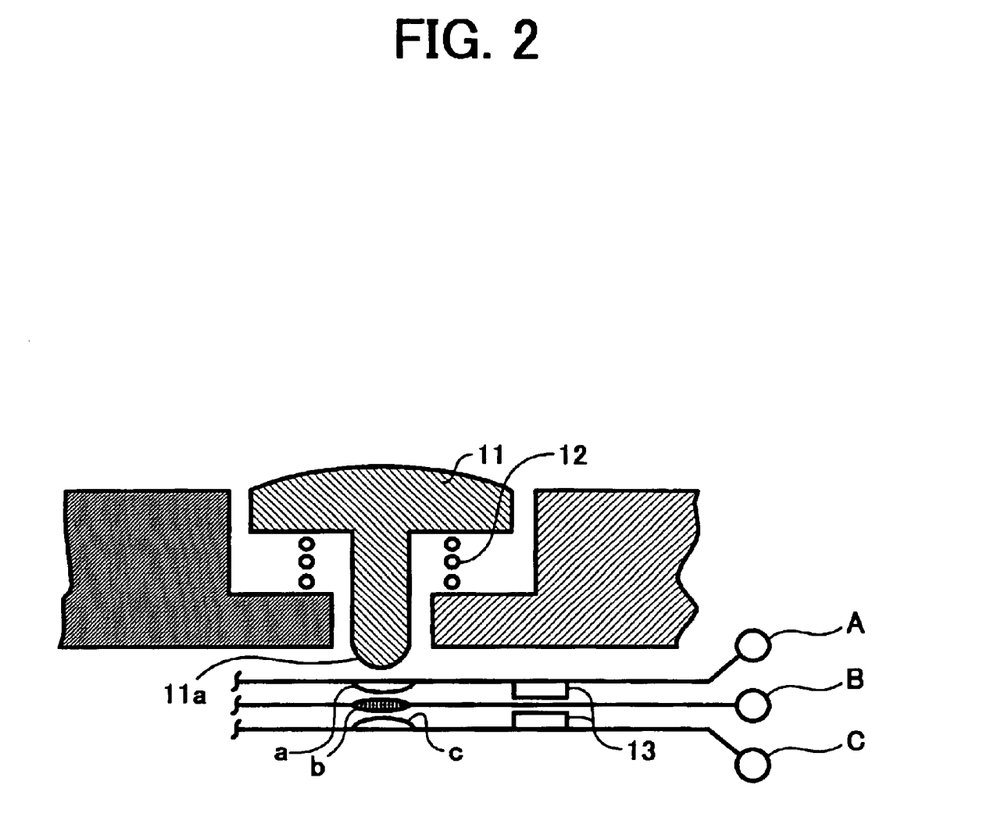
FIG. 2 is an explanatory diagram to describe an inner constitution of a periphery of a shutter release button of the digital camera shown in FIG. 1.

The shutter release button 11 is retained and biased upwardly by a spring 12 as shown in FIG. 2. Signal lines A–C are arranged in order in such a manner as to overlap above and below at a lower part of a lower end portion 11a of the shutter release button 11, and contact points a to c are respectively provided at a periphery of directly under the lower end portion 11a. The signal lines A–C are retained so as to provide a certain space by a spacer 13 to prevent the contact points a–c from contacting with respect to each other at a circumstance that the shutter release button 11 is not pressed.

The signal lines A and B have flexibility. When the shutter release button 11 is pressed-in toward the lower part, first of all the contact points a and b are contacted (half-pressed condition) by a flexing of the signal line A pressed by the lower end portion 11a of the shutter release button 11, and the contact points b and c are contacted (full-pressed condition) by the flexing of the signal line B by the further pressing of the shutter release button 11.

The contact points a and b are constituting a part of an inputting device for inputting a focusing starting trigger (means for inputting a focusing starting trigger), and the contact points b and c are constituting a part of an inputting device for inputting a photographing starting trigger (means for inputting a photographing starting trigger). That is to say, the focusing starting trigger is inputted by a short circuit of the signal lines A and B when the contact points a and b are contacted, and the photographing starting trigger is inputted by the short circuit of the signal lines B and C when the contact points b and c are contacted.

By the way, there is provided on the remote control device which 2b is not shown a remote control-shutter release button that is equivalent to the shutter release button 11. The focusing starting trigger is inputted by a half-pressing of the remote control-shutter release button as similar to the case which the contact points a and b are contacted, and the photographing starting trigger is inputted by a full-pressing of it as similar to the case in which the contact points b and c are contacted.

A side surface or a bottom surface is made capable of inserting a memory card 30 (see FIG. 3) as an outboard recording device (outboard recording means) for saving a photographed image data. A known medium such as a SD card, Compact Flash (registered trademark) or Smart Media (trade mark) is used for the memory card 30.

Figure 3:
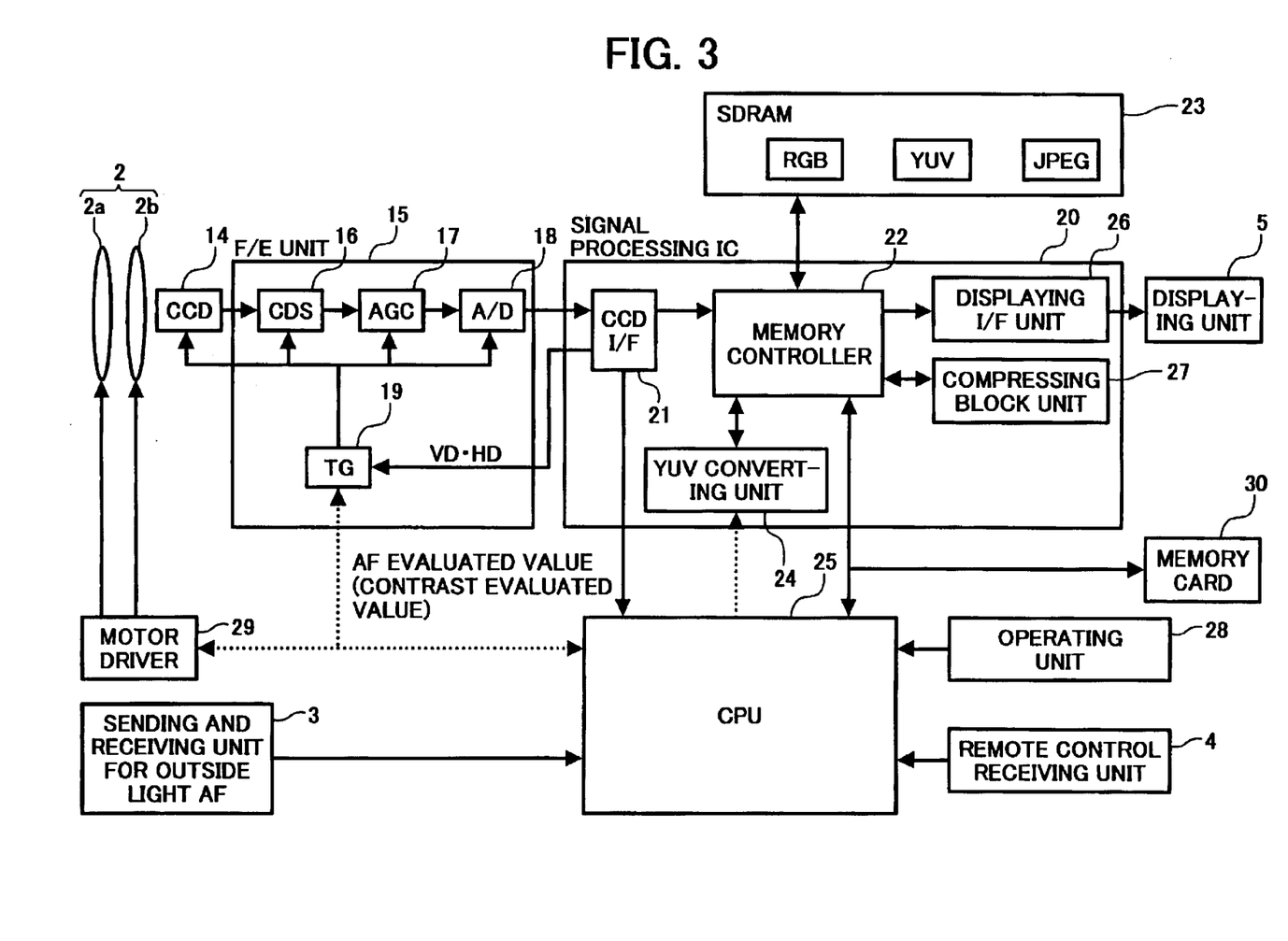
FIG. 3 is a block diagram showing an outline of the inner constitution of the digital camera shown in FIG. 1.

FIG. 3 is a block diagram showing an outline of an inner constitution of the digital camera 1. The photographing lens 2 is constituted by having a zooming lens 2a and a focus lens 2b, and a CCD 14 as an imaging element is arranged so as the image of the subject is imaged on a photo acceptance surface of the CCD 14. The CCD 14 is connected with a F/E unit 15 and sending the image of the subject imaged on its photo acceptance surface to the F/E unit 15 as an analog image signal.

The F/E unit 15 has a CDS (correlated double sampling) circuit 16, a AGC amplifier 17 and an A/D converter 18. The CDS circuit 16 is a circuit for minimizing a noise to the CCD 14. The AGC amplifier 17 corrects a level of a signal that the correlated double sampling is applied at the CDS circuit 16. The A/D converter 18 converts an analog image data from the CCD 14 that is inputted through the AGC amplifier 17 to a digital image data. That is to say, the analog image signal from the CCD 14 is converted to a digital signal (digital image data) at an optimum sampling frequency by the A/D converter 18 after transmitting through the CDS circuit 16 and the AGC amplifier 17, and is transmitted to a CCDI/F unit 21 of a signal processing IC 20.

Also, the F/E unit 15 having a timing generator (TG) 19 for creating various timing signals based on a horizontal synchronized signal (HD) and a vertical synchronized signal that are inputted from the CCDI/F unit 21.

The CCDI/F unit 21 (part of the contrast type AF device) extracts a contrast evaluated value which is used for the contrast type AF from the received digital image data of the subject's image together with sending the digital image data to a memory controller 22. The contrast evaluated value is obtained by using an output of a high pass filter of the received digital image data or an integral value of a level difference of an adjoining pixel on the CCD 14, and is sent from the CCDI/F unit 21 to a CPU 25.

The memory controller 22 carries out an input/output controlling of the image data with the CCDI/F unit 21, a SDRAM 23 as a memory device (memory means), a YUV converting unit 24, a displaying I/F unit 26 and a compressing block unit 27. The SDRAM 23 memorizes the image data in a RGB, YUV or JPEG formats sent from the memory controller 22, and the YUV converting unit 24 converts the digital image data in the RGB format to the YUV format together with carrying out various data processing such as a white balance processing or an edge enhancing processing while converting.

The displaying I/F unit 26 displays the image data from the memory controller 22 on the displaying unit 5, and the compressing block unit 27 compresses and converts the digital image data in the YUV format into the JPEG format.

When a primary color filter is used for capturing the image in the CCD 14, the digital image data passed through the A/D converter 18 becomes a RGB data, and the RGB data is sent to the SDRAM 23 through the CCDI/F unit 21.

Then, the RGB data is retrieved out from the SDRAM 23 and converted into a YUV data by the YUV converting unit 24 and the various data are applied thereto such as the white balance processing and the edge enhancing processing and sent to the SDRAM 23.

Furthermore, the YUV data are retrieved out from the SDRAM 23 and compressed into the JPEG format by the compressing block unit 27, and sent to the SDRAM 23 again. A head data or the like is added to the image data in the JPEG format in the SDRAM 23 so as to be a JPEG image while the JPEG image is displayed on the displaying unit 5 through the displaying I/F unit 21 and saved on the memory card 30 by the CPU 25.

The signal processing IC 20 is composed of the CCDI/F unit 21, memory controller 22, YUV converting unit 24, displaying I/F unit 26 and compressing block unit 27.

The CPU 25 controls the entire operation or function of the digital camera, and controls a motor driver 29 which operates the zooming lens 2a or the focus lens 2b or operates the sending and receiving unit for the outside light AF 3 based on a command for an operation from an operating unit 28 including the operating button 6 or the zooming button 7 or the command for the operation from the remote control device received from the remote control receiving unit 4.

Also, the CPU 25 compares and computes the evaluated value by receiving the contrast evaluated value from the CCDI/F unit 21 or calculates a control value including various data processing, such as the white balance processing, and sends it to the YUV converting unit 24.

As mentioned above, the CPU 25 also saves the image data in the JPEG image on the memory card 30.

Moreover, the CPU 25 carries out a receiving of the inputting of the focusing starting trigger and the inputting of the photographing starting trigger as a part of the inputting device for inputting the focusing starting trigger or the part of the inputting device for inputting the photographing starting trigger.

The outside light AF is composed of the focus lens 2b, the Bending and receiving unit for the outside light AF 3, the CPU 25 and the motor driver 29. The outside light AF projects and receives the infrared ray or the like to the subject by the sending and receiving unit for the outside light AF 3, and the CPU 25 calculates the distance to the subject based on the projected and received result and the motor driver 29 moves the focus lens 2b to a focusing position according to the calculated distance to carry out the focusing.

The contrast type AF is composed of the focus lens 2b, the CCD 14, the F/E unit 15, the CCDI/F unit 21, the CPU 25 and the motor driver 29. The contrast type AF moves the focus lens 2b gradually while carrying out a contrast evaluation at the CCDI/F unit 21 of the image scanned in the CCD 14, and compares and calculates in the CPU 25 while judging a position of the focus lens 2b which is the position when a contrast became maximum as the focusing position.

Figure 4A:
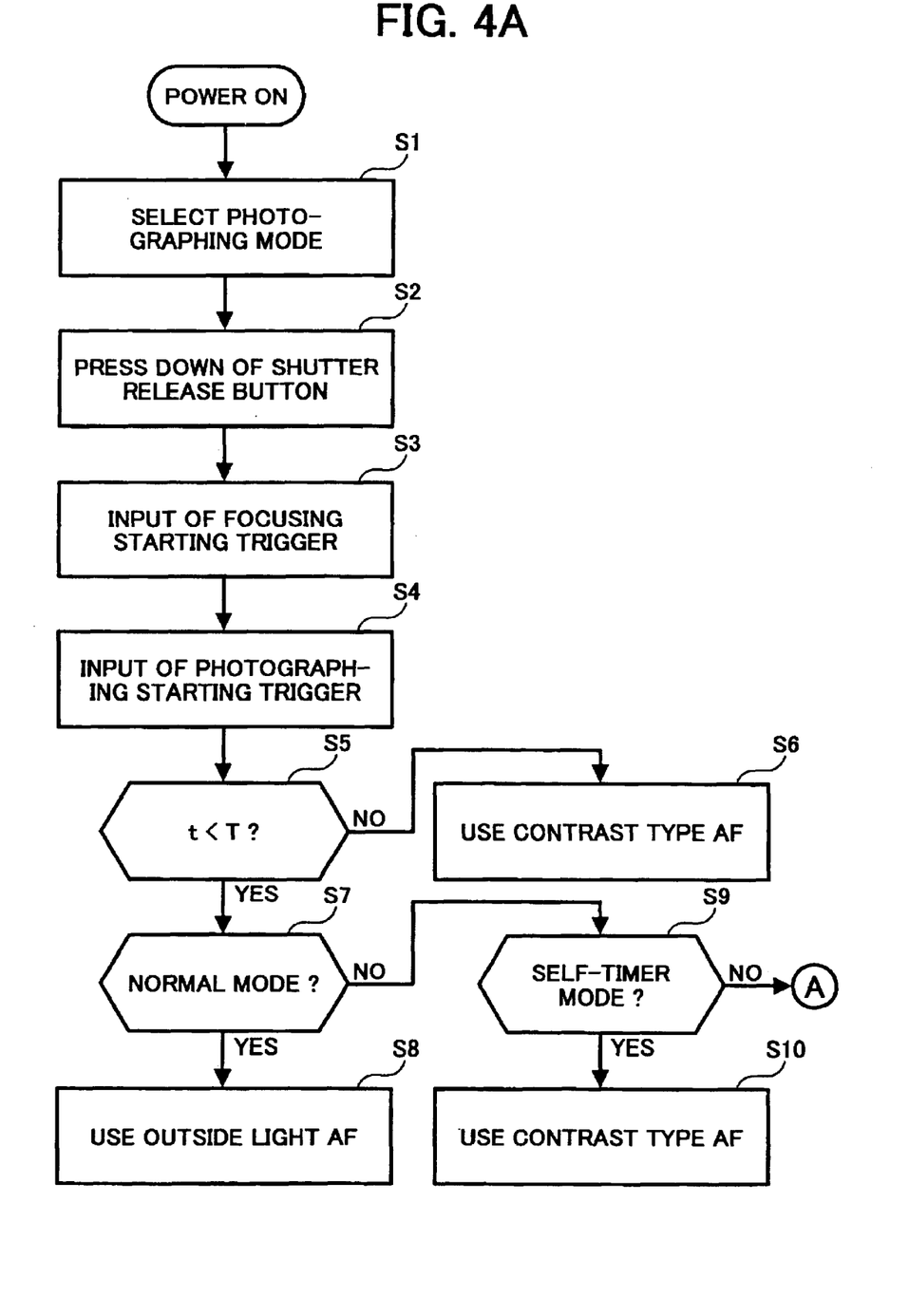
FIG. 4A is a first flowchart showing an operation at the time of photographing by the digital camera shown in FIG. 1.
Figure 4B:
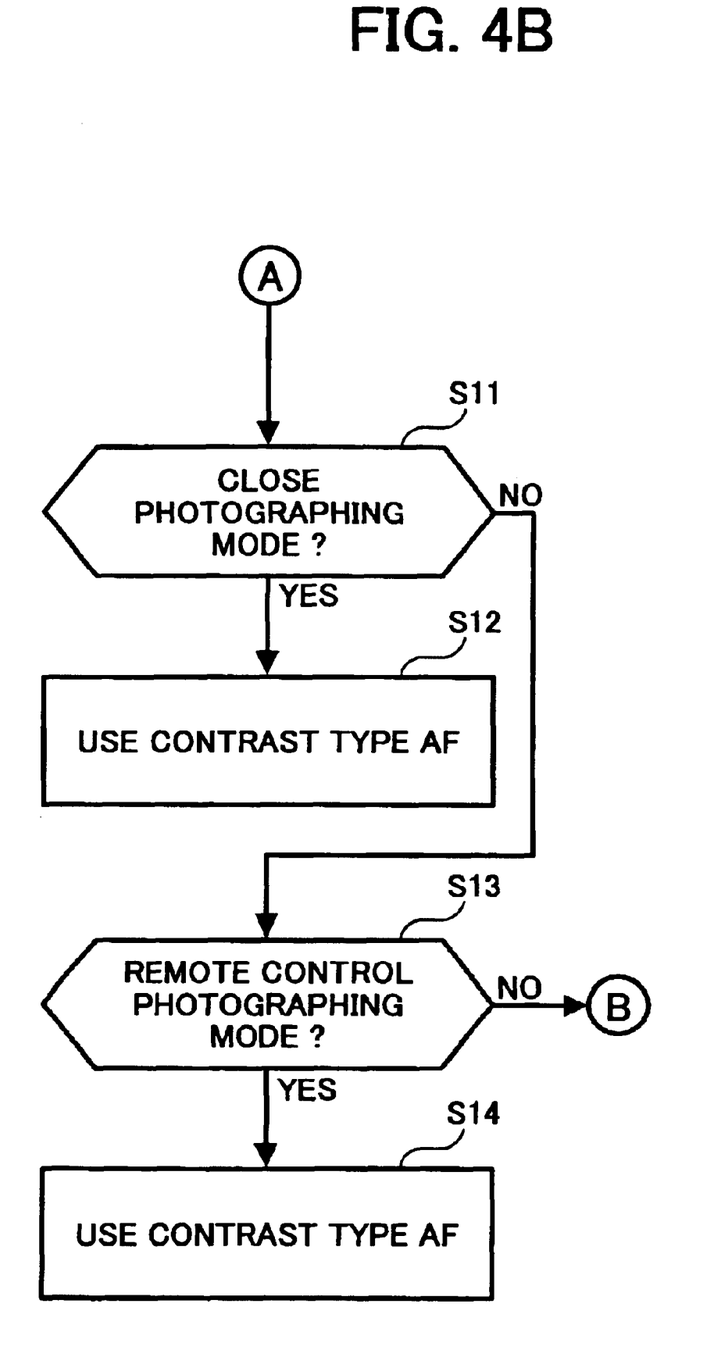
FIG. 4B is a second flowchart showing the operation at the time of photographing by the digital camera shown in FIG. 1.
Figure 4C:
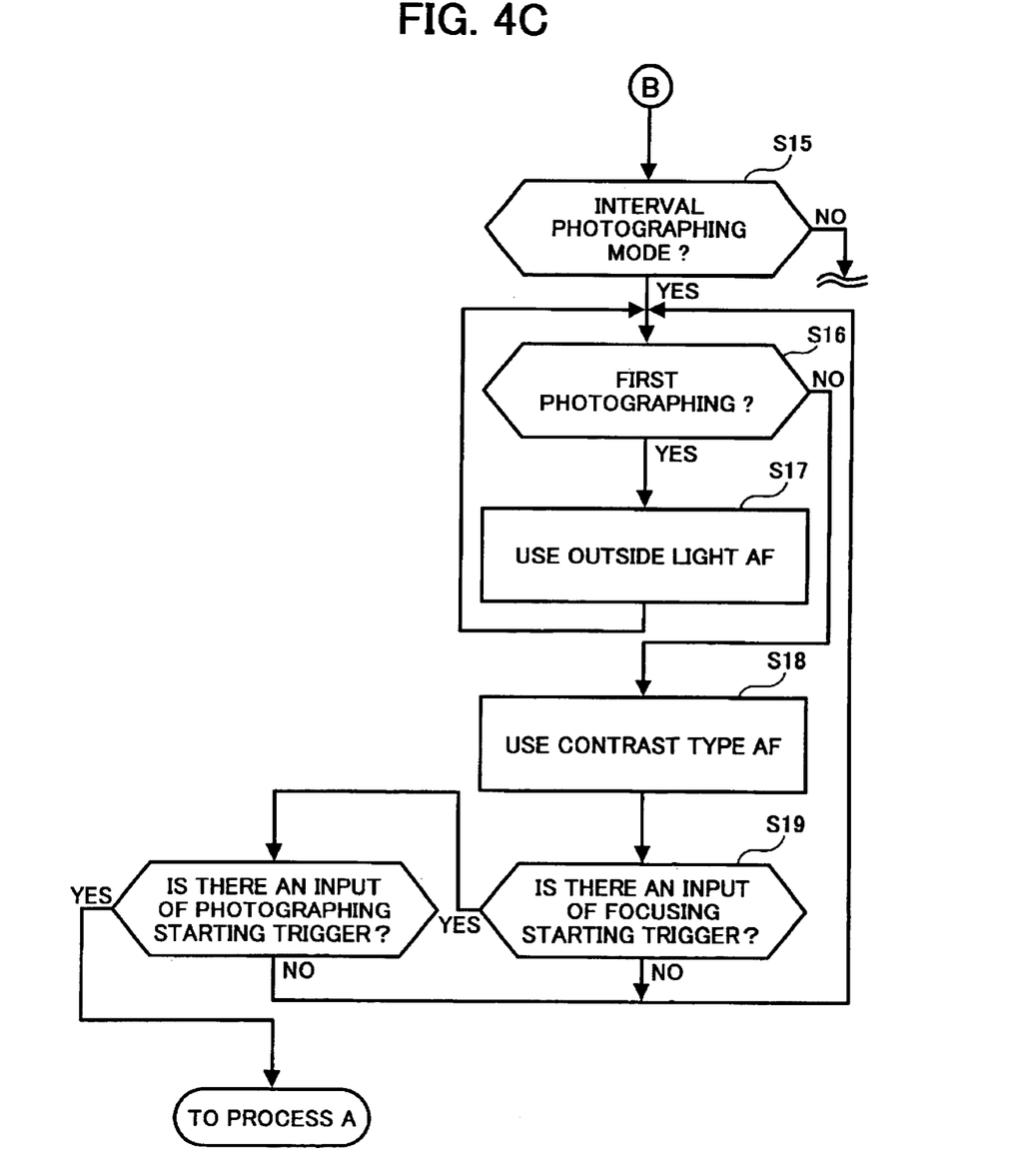
FIG. 4C is a third flowchart showing the operation at the time of photographing by the digital camera shown in FIG. 1.

Next, an operation of the digital camera 1 at the time of photographing will be described based on flowcharts shown in FIGS. 4A, 4B and 4C.

First of all, the photographer presses the power button 9 of the digital camera 1 to turn a power on, and selects the photographing mode (S.1). The digital camera is provided to be capable of selecting the normal mode and others such as the self-timer mode, the dose photographing mode, the remote control photographing mode or the interval photographical mode corresponding to the photographing condition.

Having selected the photographing mode, the photographer then presses down the shutter release button 11 and carries out the photographing of the subject (S.2). At this point, at first, the inputting of the focusing starting trigger is carried out by the contact of the contact points a and b in the condition of half-pressing the shutter release button 11 (S.3). The inputting of the photographing starting trigger is carried out by the contact of the contact points b and c when the shutter release button 11 is further pressed and turned into the full-pressed condition (S.4).

In the digital camera 1, a time took from the input of the focusing starting trigger to the input of the photographing starting trigger (hereinafter, a time between triggers) t and a predetermined time T that previously set in the digital camera 1 are compared and judged (S.5). That is, when $t \geq T$, the photographer is pressing the shutter release button 11 slowly and therefore judges that a considerably fast focusing speed is not required. Consequently, the contrast type AF which a focusing accuracy is higher is selected and used (S.6).

When the time between the triggers t<the predetermined time T, it is a case when the photographer is pressing the shutter release button 11 quickly. Here, when the photographing mode is the normal mode (S.7), the outside light AF having the higher focusing speed is selected and used since it judges that the photographer is pressing the shutter release button 11 quickly so as not to lose a timing for the photographing (S.8).

Whether the self-timer mode is selected or not is judged when the photographing mode is not the normal mode (S.9). The self-timer mode is a photographing mode that the photographing is carried out after a predetermined waiting time is passed such as a 3 seconds or 10 seconds from the input of the photographing starting trigger, therefore the considerably fact focusing speed is not required. Consequently, even when the predetermined time T has exceeded the time between the triggers (time between the triggers t<predetermined time T), the contrast type AF having the higher focusing accuracy is selected and used (S.10) in the self-timer mode.

As a result, even if the photographer presses erroneously the shutter release button 11 quickly, the contrast type AF is selected in the is self-timer mode so that the photographing that the focusing accuracy is high can be carried out.

Whether the close photographing mode is selected or not is judged when the photographing mode is not the self-timer mode (S.11). The close photographing mode is a photographing mode for carrying out the photographing by going close to the subject by setting the distance and a range capable of carrying out the photographing closer in range compared with the normal photographing.

Generally, the close photographing mode is not used when photographing a dynamic subject, therefore the considerably high focusing speed is not required. The close photographing mode is a photographing mode used for a close up photographing of the subject, therefore the high focusing accuracy is required. Also, since the distance between the digital camera 1 and the subject is close, an enough focusing cannot be carried out because of an error of a measured distance increases if the outside light AF is used when the sending and receiving unit for the outside light AF 3 is provided at a position away from the photographing lens 2.

Consequently, oven when the predetermined time T exceeds the time between the triggers (time between the triggers t<predetermined time T), the contrast type AF having the higher focusing accuracy is selected and used (S.12) in the close photographing mode.

As a result, even if the photographer presses erroneously the shutter release button 11 quickly, the contrast type AF is selected in the close photographing mode so that it is possible to carry out the photographing in which the focusing accuracy is high.

Whether the remote control photographing mode is selected or Dot is judged when the photographing mode is not the close photographing mode (S.13). The remote control photographing mode is a mode capable of carrying out the photographing operation by the remote control device, that is to say, it is the photographing mode capable of carrying out the inputting of the focusing starting trigger and the inputting of the photographing starting trigger.

In the remote control photographing mode, the remote control-shutter release button is pressed instead of the shutter release button 11. Generally, the remote control photographing mode is not so suitable for photographing the dynamic subject since a confirmation of the subject by the viewfinder 8 is often not carried out when photographing by the remote control photographing mode. In addition, since it is often a case that the photographer itself who carries out an operation of the remote control is the subject, the photographing is adapted to be carried out after a few seconds later then the input of the photographing starting trigger so as not to carry out the photographing while operating the remote control, so that the considerably high focusing speed is not required.

Consequently, in the remote control photographing mode, even when the photographing operation is carried out by the remote control and the predetermined time T exceeds the time between the triggers (time between the triggers t<predetermined time T), the contrast type AF having the higher focusing accuracy is selected and used (S.14). As a result, the contrast type AF is selected in the remote control photographing mode so that it is possible to carry out the photographing which the focusing accuracy is high.

When the photographing mode is not the remote control photographing mode, whether or not it is the interval photographical mode is judged (S15). Although further judgment about whether it is another photographing mode or not is carried out and a process suited to the photographing mode is carried out when the photographing mode is not the interval photographical mode, its description is omitted.

The interval photographical mode is a photographing mode which the photographing is repeatedly carried out automatically in every certain time interval after the photographing starting trigger is inputted. In a series of photographs using the interval photographical mode, a first photographing is carried out immediately after the input of the photographing starting trigger, that is, the first photographing is carried out soon after the photographer has pressed down the shutter release button 11, and the photographing after the first photographing (second photographing and from then on) is carried out automatically after the certain time is elapsed from the prior photographing.

The photographer only has to press down the shutter release button 11 once at the first time of the photographing and the photographing after the first time is carried out automatically without a necessity of the photographer to press down the shutter release button 11.

Since the first photographing is carried out immediately after the press down of the shutter release button 11, it is judged that the photographer is pressing down the shutter release button 11 quickly so as not to lose the timing for the photographing when the predetermined time T exceeds the time between the triggers (time between the triggers t<predetermined time T). In addition, since the photographing after the first time is carried out after the certain time is elapsed from the prior photographing, the considerably high focusing speed is not required.

Therefore, when the photographing starting trigger is inputted in the interval photographical mode, it is judged whether the photographing is the first photographing or not (S.16), and when the photographing is the first photographing, the outside light AF which the focusing speed is higher is selected and used (S.17). When the photographing is after the first photographing, the contrast type AF in which the focusing accuracy is higher is selected and used (S.18).

In the digital camera 1, the photographer can carry out the photographing by pressing down the shutter release button 11 even while the series of photographing is carried out by the interval photographical mode. That is, it is possible to carry out the photographing immediately if the photographer presses down the shutter release button 11 in such a case that the another timing for the photographing has suddenly occurred while photographing with the interval photographical mode, even though the certain time has not elapsed after the prior photographing.

When the photographer presses down the shutter release button 11 while photographing with the interval photographical mode, the focusing stating trigger is inputted (S.19), further, the photographing starting trigger is inputted (S.20), and a process A is started.

In the process A, the judgment and the comparison between the time between the triggers t and the predetermined time T at the time of such operation are carried out. When the predetermined time T is exceeding the time between the triggers t (time between the triggers t<predetermined time T), the outside light AF which the focusing speed is higher is selected and used by judging that the photographer is pressing down the shutter release button 11 quickly so as not to lose the timing for the photographing. When the time between the triggers t exceeds or equal to the predetermined time T (time between the triggers t≧predetermined time T), the photographer presses down the shutter release button 11 slowly, therefore the contrast type AF which the focusing accuracy is higher is selected and used by judging that the considerably high focusing speed is not required.

By the way, although the contrast type AF is used in (S.6), (S.10), (S.12), (S. 14) and (S.18) in the aforementioned embodiment, it is also recommendable to use in combination with the contrast type AF and the outside light AF in (S.6), (S.10), (8.12), (S. 14) and (S.18) of the above embodiment.

The combination of the contrast type AF and the outside light AF is, for example, after measuring the distance to the subject by the outside light AF and moving the focus lens 2b to near the focusing position, judges the focusing position by moving the focus lens 2b further in a range of the near focusing position having a relatively small range for the lens to move by the contrast type AF while evaluating the contrast of the subject's image.

According to the AF relating to the above combination, since it is possible to carry out the high accuracy focusing by the evaluation of the contrast by having moved the focus lens 2b to near the focusing position quickly, the high focusing accuracy can be obtained together with maintaining the high focusing speed.

<Modification>

In the above embodiment, the contact points a–c are arranged at the lower part of the shutter release button 11, and the focusing starting trigger is inputted by the half-pressing of the shutter release button 11, and the photographing starting trigger is inputted by the full-pressing of the shutter release button 11.

Figure 5:
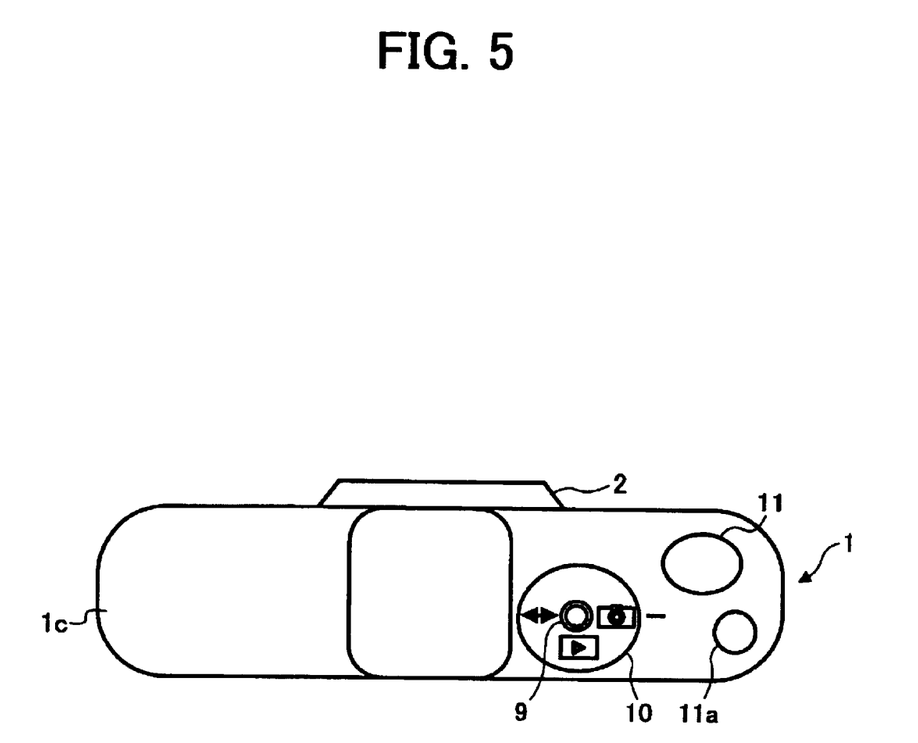
FIG. 5 is an outside top view diagram describing an arrangement of buttons of the digital camera relating to the modification of the present invention.

However, it is also recommendable to provide the shutter release button 11 and a focusing button 11a separately on the upper surface of the digital camera 1 as shown in FIG. 5 to input the focusing starting trigger by the pressing down of the focusing button 11a and to input the photographing starting trigger by the pressing down of the shutter release button 11.

In this case, provided on the remote control device which is not shown are a remote control focusing button which is equivalent to the focusing button 11a, other then the remote control-shutter release button which is equivalent to the shutter release button 11, anal the focusing starting trigger is inputted by pressing down the remote control focusing button and the photographing starting trigger is inputted by pressing down the remote control-shutter release button.

Figure 6A:
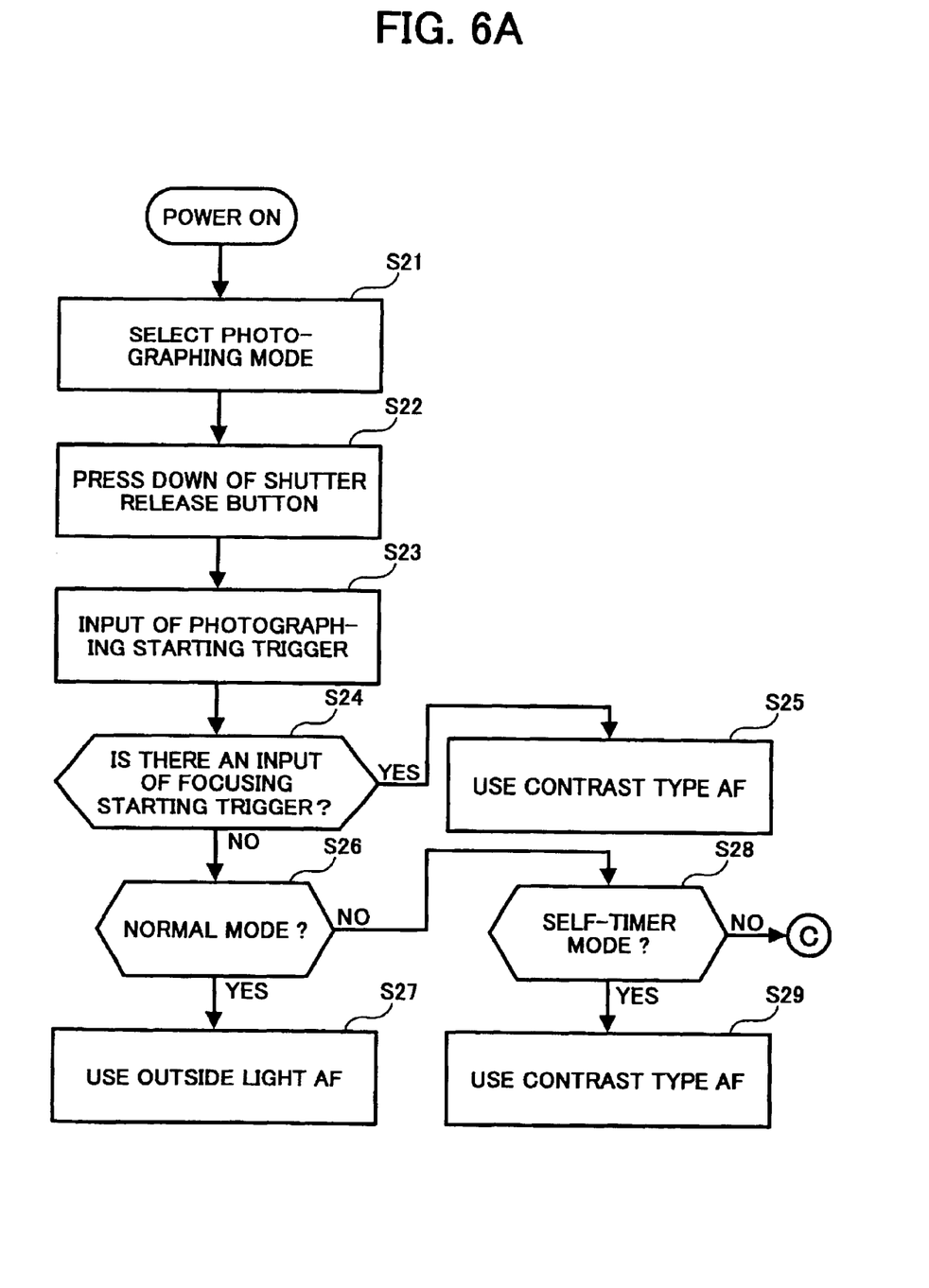
FIG. 6A is a first flowchart showing the operation at the time of photographing by the digital camera shown in FIG. 5.
Figure 6B:
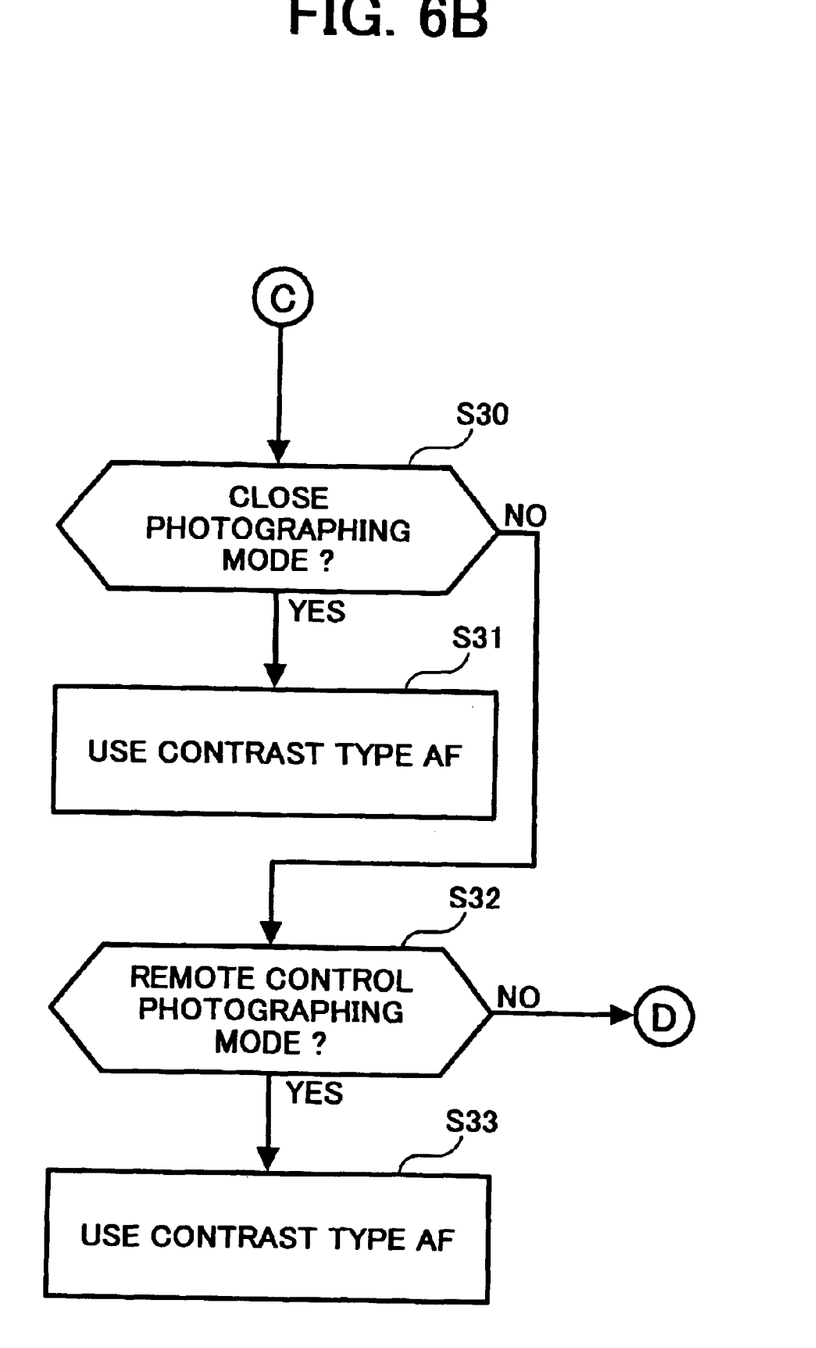
FIG. 6B is a second flowchart showing the operation at the time of photographing by the digital camera shown in FIG. 5.
Figure 6C:
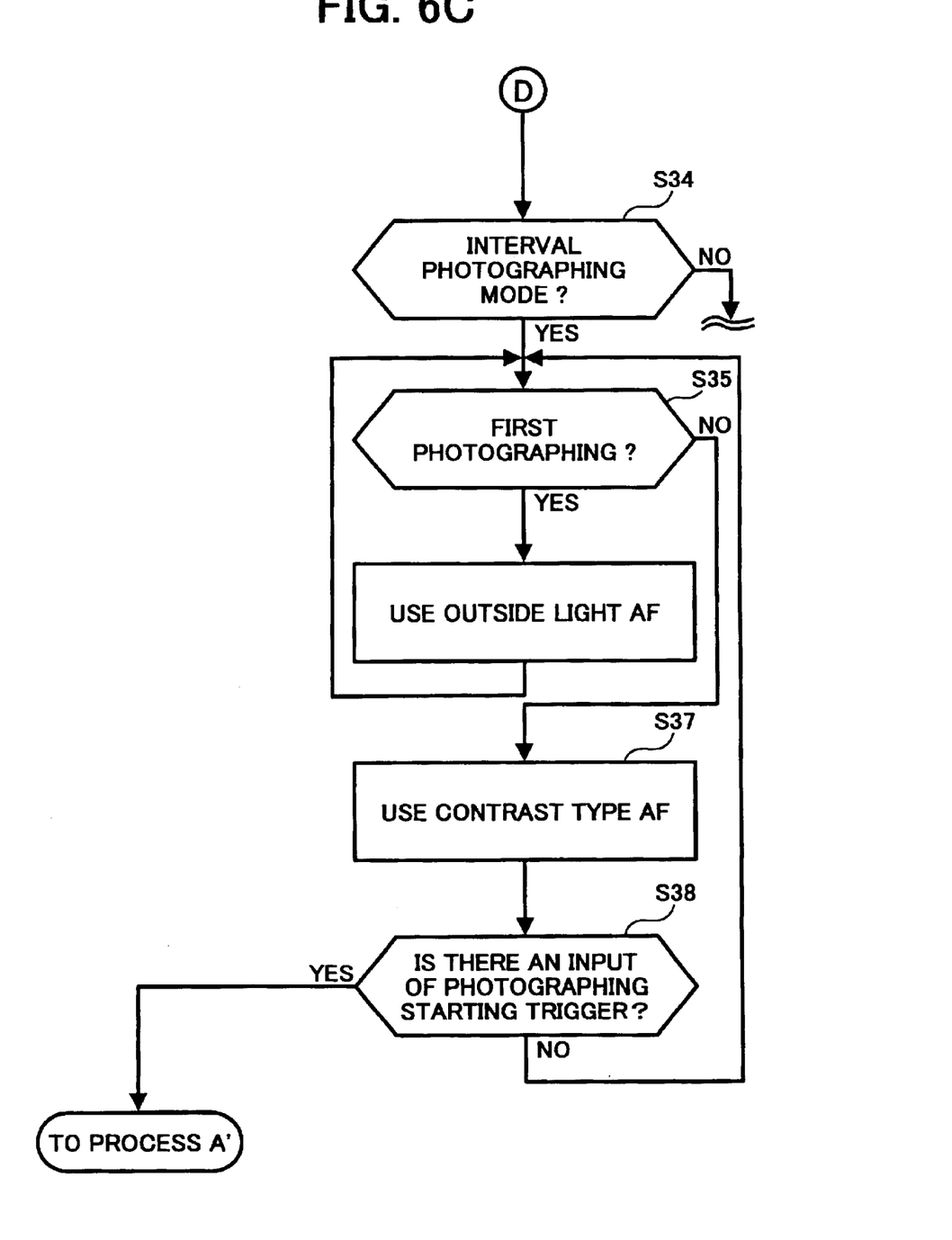
FIG. 6C is a third flowchart showing the operation at the time of photographing by the digital camera shown in FIG. 5.

In the digital camera relating to the modification, as shown in FIG. 6A, FIG. 6B and FIG. 6C, the photographing mode is selected (S.21), and when the shutter release button 11 is pressed down (S.22), the photographing starting trigger is inputted (S.23). Then, the judgment of whether or not there is the input of the focusing starting trigger before the input of the photographing starting trigger is carried out (S.24). When there is the input of the focusing starting trigger, that is, when there is the press down of the focusing button 11a before the press down of the shutter release button 11, the contrast type AF which the focusing accuracy is higher is selected End used since it is judged that the considerably high focusing speed is not required (S. 25).

When there is no input of the focusing starting trigger, that is to say, when there is no press down of the focusing button 11a before the press down of the shutter release button 11, the judgment of whether the photographing mode is the normal mode or not is carried out (S. 26). When the photographing mode is the normal mode, the outside light AF which the focusing speed is higher is selected and used (S. 27) since it is judged that the photographer wishes to carry out the photographing quickly so as not to lose the timing for the photographing.

When the photographing mode is the self-timer mode (S. 28) or the close photographing mode (S. 30), the contrast type AF is selected and used for both the self-timer mode or the close photographing mode even when the focusing button 11a is not pressed down (S.29), (S.31), as the considerably high focusing speed is not required. As well as in the case which the photographing mode is the remote control photographing mode (S.32), as the considerably high focusing speed is not required, the contrast type AF is selected and used even when the remote control focusing button which is a substitute for the focusing button 11a is not pressed down (S.33).

When the photographing mode is the interval photographical mode (S. 34), the judgment of whether or not the photographing is the first photographing in the series of photographing is carried out (S. 35). If the photographing is the first photographing, the outside light AF which the focusing speed is higher is selected and used (S.36), and if the photographing is after the first photographing, the contrast type AF which the focusing accuracy is higher is selected and used (S.37).

Although further judgment that whether it is another photographing mode or not is carried out and the process which is suited to that photographing mode is carried out when the photographing mode is not the interval photographical mode, its description is omitted.

When the photographer presses down the shutter release button 11 while photographing with the interval photographical mode, the photographing starting trigger is inputted (S.38), and a process A' is started.

In the process A', the judgment of whether or not there is the input of the focusing starting trigger before the input of the photographing starting mode is carried out, and the contrast type AF is selected and used when there is the input of the focusing starting trigger. When there is no input of the focusing starting trigger, the outside light AF which the focusing speed is higher 18 selected and used since it is judged that the photographer wishes to carry out the photographing quickly so as not to lose the timing for the photographing.

As described above, according to the invention relating to the first aspect of the present application, since it has the photographing mode that carrying out the focusing by the contrast type AF device even when the command for the operation for selecting the focusing by the ranging type AF device is carried by the photographer, it is possible to obtain the high focusing accuracy regardless of the photographer's operation in that photographing mode, therefore, it is possible to avoid a photographing error before it happens.

According to the invention relating to the second and third aspects, since the focusing by the contrast type AF device or the combination of the contrast type AF device and the ranging type AF device is carried out in the photographing condition which the high focusing accuracy is required regardless of the photographer's operation, it is possible to avoid the photographing error before it happens.

According to the invention relating to the fourth and fifth aspects, since the focusing by the contrast type AF device or the combination of the contrast type AF device and the ranging type AF device is carried out in the photographing by the self-timer mode regardless of the photographer's operation, it is possible to obtain the high focusing accuracy so that can avoid the photographing error before it happens.

According to the invention relating to the sixth and seventh aspects, since the focusing by the contrast type AF device or the combination of the contrast type AF device and the ranging type AF device is carried out in the photographing by the close photographing mode regardless of the photographer's operation, it is possible to obtain the high focusing accuracy so that can avoid the photographing error before it happens.

According to the invention relating to the eighth and ninth aspects, since the focusing by the contrast type AF device or the combination of the contrast type AF device and the ranging type AF device is carried out in the photographing by the remote control photographing mode regardless of the photographer's operation, it is possible to obtain the high focusing accuracy so that can avoid the photographing error before it happens.

According to the invention relating to the tenth and eleventh aspects, in the photographing by the interval photographical mode, since it is possible to carry out the photographing without losing the timing for the photographing or by obtaining the high focusing accuracy based on the photographer's operation in the first photographing within the series of photographing together with capable of carrying out the photographing by obtaining the high focusing accuracy regardless of the photographer's operation in the photographing after the first photographing, it is possible to avoid the photographing error before it happens.

According to the invention relating to the twelfth, thirteenth, fourteenth and fifteenth aspects, it is possible to carry out the photographing without losing the timing for the photographing or by obtaining the high focusing accuracy based on the photographer's operation even when the shutter release button is pressed while photographing by the interval photographical mode.

what is claimed is:

1. A camera apparatus with an auto focusing function comprising:
    a ranging type auto focusing device for carrying out a focusing by measuring a distance to a subject and moving a focus lens to a focusing position corresponding to the measured distance; and
    a contrast type auto focusing device for carrying out the focusing by moving said focus lens while evaluating a contrast of an image of the subject obtained through the focus lens and judging a focusing position based on the evaluated contrast together with stopping said focus lens at the judged focusing position;
    said apparatus being capable of selecting either said ranging type auto focusing device or said contrast type auto focusing device to carry out the focusing based on a command for an operation of a photographer;
    said apparatus having a photographing mode to carry out the focusing by said contrast type auto focusing device even when the command for the operation to select the focusing by said ranging type auto focusing device being carried out by said photographer.

2. A camera apparatus with an auto focusing function comprising:
    a ranging type auto focusing device for carrying out a focusing by measuring a distance to a subject and moving a focus lens to a focusing position corresponding to the measured distance;
    a contrast type auto focusing device for carrying out the focusing by moving said focus lens while evaluating a contrast of an image of the subject obtained through the focus lens and judging a focusing position based on the evaluated contrast together with stopping said focus lens at the judged focusing position;
    an inputting device for inputting a focusing starting trigger for receiving the inputting of the focusing starting trigger which is for starting said focusing; and
    an inputting device for inputting a photographing starting trigger for receiving the inputting of the photographing starting trigger which is for starting a photographing of said subject;
    said apparatus having a photographing mode to carry out the focusing by said contrast type auto focusing device or a combination of said contrast type auto focusing device and said ranging type auto focusing device when said photographing starting trigger being inputted into said inputting device for inputting the photographing starting trigger within a predetermined time after said focusing starting trigger being inputted into said inputting device for inputting the focusing starting trigger.

3. A camera apparatus with an auto focusing function comprising:
    a ranging type auto focusing device for carrying out a focusing by measuring a distance to a subject and moving a focus lens to a focusing position corresponding to the measured distance;
    a contrast type auto focusing device for carrying out the focusing by moving said focus lens while evaluating a contrast of an image of the subject obtained through the focus lens and judging a focusing position based on the evaluated contrast together with stopping said focus lens at the judged focusing position;
    an inputting device for inputting a focusing starting trigger for receiving the inputting of the focusing starting trigger which is for starting said focusing; and
    an inputting device for inputting a photographing starting trigger for receiving the inputting of the photographing starting trigger which is for starting a photographing of said subject;
    said apparatus having a photographing mode to carry out the focusing by said contrast type auto focusing device or a combination of said contrast type auto focusing device and said ranging type auto focusing device when said photographing starting trigger being inputted into said inputting device for inputting the photographing starting trigger without said focusing starting trigger being inputted into said inputting device for inputting the focusing starting trigger.

4. The apparatus according to claim 2, wherein
    said apparatus has a self-timer mode for carrying out the photographing of said subject after a certain waiting time is elapsed after said photographing starting trigger is inputted into said inputting device for inputting the photographing starting trigger; and
    said photographing mode is the self-timer mode.

5. The apparatus according to claim 3, wherein
    said apparatus hats a self-timer mode for carrying out the photographing of said subject after a certain waiting time is elapsed after said photographing starting trigger is inputted into said inputting device for inputting the photographing starting trigger; and
    said photographing mode is the self-timer mode.

6. The apparatus according to claim 2, wherein
    said apparatus has a close photographing mode which the distance and a range photographable are set closer than that of a normal photographing so as to carry out the photographing of said subject by being close to the subject; and
    said photographing mode is the close photographing mode.

7. The apparatus according to claim 3, wherein
    said apparatus has a close photographing mode which the distance and a range photographable are set closer than that of a normal photographing so as to carry out the photographing of said subject by being close to the subject; and
    said photographing mode is the close photographing mode.

8. The apparatus according to claim 2, wherein
    said apparatus has a remote control photographing mode which carries out the inputting of said focusing starting trigger and said photographing starting trigger by an operation of a remote control; and said photographing mode is the remote control photographing mode.

9. The apparatus according to claim 3, wherein said apparatus has a remote control photographing mode which carries out the inputting of said focusing starting trigger and said photographing starting trigger by an operation of a remote control; and said photographing mode is the remote control photographing mode.

10. A camera apparatus with an auto focusing function comprising:

a ranging type auto focusing device for carrying out a focusing by measuring a distance to a subject and moving a focus lens to a focusing position corresponding to the measured distance;

a contrast typo auto focusing device for carrying out the focusing by moving said focus lens while evaluating a contrast of an image of the subject obtained through the focus lens and judging a focusing position based on the evaluated contrast together with stopping said focus lens at the judged focusing position;

an inputting device for inputting a focusing starting trigger for receiving the inputting of the focusing starting trigger which is for starting said focusing; and an inputting device for inputting a photographing starting trigger for receiving the inputting of the photographing starting trigger which is for starting a photographing of said subject;

said apparatus having an interval photographical mode which the photographing being repeatedly carried out in every certain time interval automatically when the photographing starting trigger being inputted into the inputting device for inputting the photographing starting trigger;

the focusing of a first photographing being carried out by said ranging type auto focusing device and the focusing of a second photographing and from then on are carried out by said contrast type auto focusing device or a combination of said contrast type auto focusing device and said ranging type auto focusing device within a series of photographing in the interval photographical mode when said photographing starting trigger being inputted into said inputting device for inputting the photographing starting trigger within a predetermined time after said focusing starting trigger being inputted into said inputting device for inputting the focusing starting trigger in the interval photographical mode.

11. A camera apparatus with an auto focusing function comprising:

a ranging type auto focusing device for carrying out a focusing by measuring a distance to a subject and moving a focus lens to a focusing position corresponding to the measured distance;

a contrast type auto focusing device for carrying out the focusing by moving said focus lens while evaluating a contrast of an image of the subject obtained through the focus lens and judging a focusing position based on the evaluated contrast together with stopping said focus lens at the judged focusing position;

an inputting device for inputting a focusing starting trigger for receiving the inputting of the focusing starting trigger which is for starting said focusing;

an inputting device for inputting a photographing Starting trigger for receiving the inputting of the photographing starting trigger which is for starting a photographing of Raid subject; and said apparatus having an interval photographical mode which the photographing being repeatedly carried out in every certain time interval automatically when the photographing starting trigger being inputted into the inputting device for inputting the photographing starting trigger, the focusing of a first photographing being carried out by said ranging type auto focusing device and the focusing of a second photographing and from then on being carried out by said contrast type auto focusing device or a combination of said contrast type auto focusing device and said ranging type auto focusing device within a series of photographing in the interval photographical mode when said photographing starting trigger being inputted into said inputting device for inputting the photographing starting trigger without said focusing starting trigger being inputted into said inputting device for inputting the focusing starting trigger in the interval photographical mode.

12. The apparatus according to claim 10, wherein the focusing is carried out by said ranging type auto focusing device when said photographing starting trigger is inputted within a predetermined time after said focusing starting trigger is inputted into said inputting device for inputting a focusing starting trigger during the photographing by said interval photographical mode.

13. The apparatus according to claim 11, wherein the focusing is carried out by said ranging type auto focusing device when said photographing starting trigger is inputted within a predetermined time after said focusing starting trigger is inputted into said inputting device for inputting a focusing starting trigger during the photographing by said interval photographical mode.

14. The apparatus according to claim 10, wherein the focusing is carried out by said ranging type auto focusing device when said photographing starting trigger is inputted into said inputting device for inputting the photographing starting trigger without said focusing starting trigger being inputted into said inputting device for inputting the focusing starting trigger during the photographing by said interval photographical mode.

15. The apparatus according to claim 11, wherein the focusing is carried out by said ranging type auto focusing device when said photographing stating trigger is inputted into said inputting device for inputting the photographing starting trigger without said focusing starting trigger being inputted into said inputting device for inputting the focusing starting trigger during the photographing by said interval photographical mode.

* * * * *